US008867250B2

(12) United States Patent
Hua

(10) Patent No.: US 8,867,250 B2
(45) Date of Patent: Oct. 21, 2014

(54) HIGH OUTPUT CURRENT SPLIT PACKAGE A/C ADAPTER

(75) Inventor: Guichao Hua, Hangzhou (CN)

(73) Assignee: Inventronics (Hangzhou), Inc., Hangzhou (CN)

( * ) Notice: Subject to any disclaimer, the term of this patent is extended or adjusted under 35 U.S.C. 154(b) by 467 days.

(21) Appl. No.: 12/340,671

(22) Filed: Dec. 20, 2008

(65) Prior Publication Data

US 2009/0161395 A1  Jun. 25, 2009

Related U.S. Application Data

(60) Provisional application No. 61/043,520, filed on Apr. 9, 2008.

(30) Foreign Application Priority Data

Dec. 20, 2007  (CN) .......................... 2007 1 0300588

(51) Int. Cl.
*H02M 1/088* (2006.01)
*H02M 3/156* (2006.01)
*H02M 3/335* (2006.01)
*H02M 1/096* (2006.01)
*H02M 1/00* (2006.01)

(52) U.S. Cl.
CPC .......... *H02M 3/156* (2013.01); *H02M 3/33507* (2013.01); *H02M 2001/007* (2013.01)

USPC .............................. 363/146; 363/125; 363/76

(58) Field of Classification Search
USPC ................. 363/76, 77, 84, 89, 125, 146, 147; 323/266
See application file for complete search history.

(56) References Cited

U.S. PATENT DOCUMENTS

| | | | | |
|---|---|---|---|---|
| 5,619,404 | A * | 4/1997 | Zak | 363/21.09 |
| 5,771,160 | A * | 6/1998 | Seong | 363/20 |
| 5,953,321 | A * | 9/1999 | Berrada et al. | 370/322 |
| 6,266,261 | B1* | 7/2001 | Lanni | 363/144 |
| 7,301,755 | B2* | 11/2007 | Rodriguez et al. | 361/676 |
| 2002/0075711 | A1 | 6/2002 | Miles | |
| 2003/0082952 | A1 | 5/2003 | Miles | |
| 2004/0062058 | A1* | 4/2004 | Hann et al. | 363/15 |
| 2004/0120168 | A1 | 6/2004 | Miles | |
| 2005/0117376 | A1* | 6/2005 | Wilson | 363/142 |
| 2007/0159858 | A1* | 7/2007 | Spindler et al. | 363/37 |

* cited by examiner

*Primary Examiner* — Adolf Berhane
*Assistant Examiner* — Nusrat Quddus
(74) *Attorney, Agent, or Firm* — Terry M. Sanks, Esq.; Beusse Wolter Sanks & Maire, P.A.

(57) ABSTRACT

A power adapter, including an AC input terminal, an AC-DC power converter, a DC-DC power converter, and an output terminal, wherein the AC-DC power converter and the DC-DC power converter are separate components, and wherein the power AC input terminal, AC-DC power converter, DC-DC power converter and the output terminal are connected sequentially via a plurality of cords.

10 Claims, 3 Drawing Sheets

HIGH OUTPUT CURRENT SPLIT PACKAGE A/C ADAPTER

CROSS-REFERENCE TO RELATED APPLICATIONS

This application claims priority of Chinese Patent Application No. 200710300588.2 filed Dec. 20, 2007, which is incorporated herein by reference. This application also claims benefit of U.S. Provisional Application No. 61/043,520 filed Apr. 9, 2008, and is incorporated herein by reference.

BACKGROUND OF THE INVENTION

The present invention relates to a power supply device. More specifically, it relates to a novel split packaging power adapter for high output current applications.

A power adapter of the prior art can be seen in FIG. 1. This power adapter includes an input terminal 1, an A/C cord (or wire) 2, an AC-DC power converter 3, a length of DC cord (or wire) 4, and an output terminal 5. DC cord 4 of the prior art carries lower voltage and greater current, and thus the entire length of DC cord 4 must be sized to handle the current requirements An alternating current (AC) voltage is converted by the power converter 3 into direct current (DC) voltage to provide power to a load via the long output cord 4. As the output cord 4 from an AC-DC converter 3 to the output terminal 5 is long, there are several limitations to the prior art power adapter, especially in the event low voltage with high current outputs are desired. For example, when the required output current is high, there can be considerable power loss in the output cord 4, and consequently, the efficiency of the power converter 3 can be lowered. Further, the overall performance of the power adapter may be impaired due to the deterioration of output regulation caused by significant voltage drop in the output cord 4. In addition, when the power module generates high output current, a thicker output wire used in the output cord 4 is required, and consequently there will be an increase in the size, weight and cost of the output cord, and hence the power adapter. Finally, the prior art power adapter is not convenient to carry due to its lack of flexibility.

BRIEF DESCRIPTION OF THE INVENTION

The present invention solves the above-mentioned issues by employing a split package in the power adapter. In one embodiment the power adapter includes an AC input terminal, an AC-DC power converter, a DC-DC power converter separated from the AC-DC power converter, and an output terminal. The power AC input terminal, AC-DC power converter, DC-DC power converter and the output terminal are connected sequentially via cords.

In another exemplary embodiment, the power adapter is for converting AC power to DC power, and includes an AC input terminal, an AC-DC power converter proximate the AC input terminal, a DC-DC power converter separated from the AC-DC power converter, an output terminal proximate the DC-DC power converter, a first cord electrically connecting the AC-DC power converter to the DC-DC power converter, and a second cord electrically connecting the DC-DC power converter to the output terminal. The second cord is of a minimum length.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Reference will now be made in detail to the embodiments consistent with the invention, examples of which are illustrated in the accompanying drawings.

Figure 1:
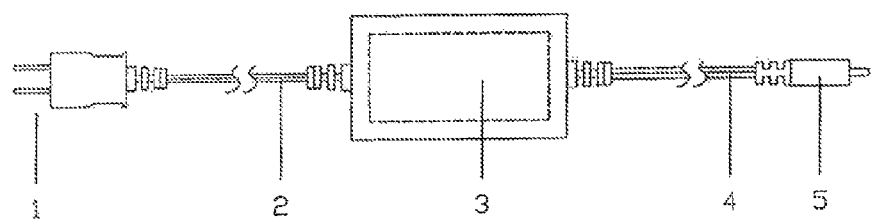
FIG. 1 is the diagram of the structure of a prior art power adapter.
Figure 2:
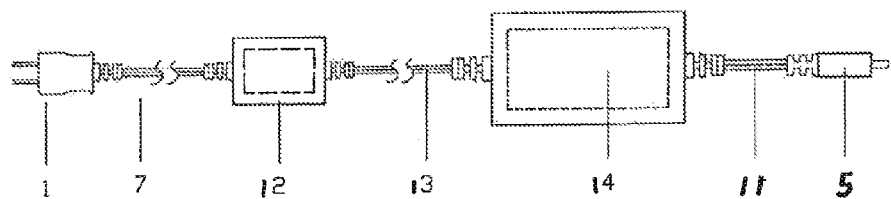
FIG. 2 is the diagram of an exemplary embodiment of a structure of a novel power adapter.

As shown in FIG. 2, the novel power adapter covered by this invention includes input terminal 1, an alternating current (AC) cord 7, an alternating current-to-direct current (AC-DC) power converter 12, a first direct current (DC) cord 13, a direct current-to-direct current (DC-DC) power converter 14, a second DC cord 11 and an output terminal 5. The AC-DC power converter 12 and DC-DC power converter 14 are packaged separately, whereas the input terminal 1, AC-DC power converter 12, DC-DC power converter 14, and the output terminal 5 are connected consecutively through DC cord 13 & 11, and AC cord 7, where the DC cord 13 is long and the DC cord 11 is very short. The separate components of the power adapter may be connected to each other sequentially, in the order presented above, by permanently attached the cords 7, 13, 11, or by having these cords 7, 13, 11 as removable cords.

The term "cord" is not intended to be limiting. The intent of the term is to convey that an element, such as but not limited to the element including an electrical wire, is provided between the components disclosed herein to provide a path for electricity to flow.

Figure 3:
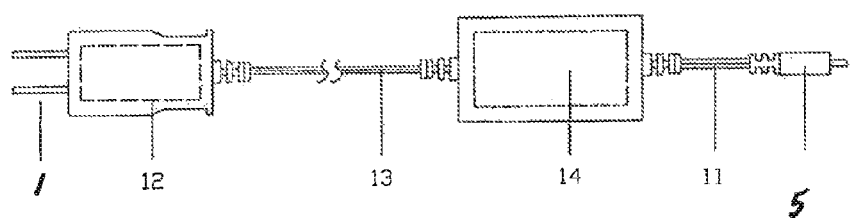
FIG. 3 is the diagram of another exemplary embodiment of a structure of a novel power adapter.

FIG. 3 is the diagram of another exemplary embodiment of a structure of a novel power adapter. The AC-DC power converter 12 is a part of the input terminal 1. By having the AC-DC power converter 12 and the input terminal 1 as a single unit the AC cord 7 disclosed in FIG. 2 is not provided. The AC-DC power converter 12, DC cord 13, DC-DC power converter 14, DC cord 11 and output terminal 5 are provided as disclosed above. In this embodiment, the AC-DC power converter 12 and DC-DC power converter 14 are also packaged separately.

Figure 4:
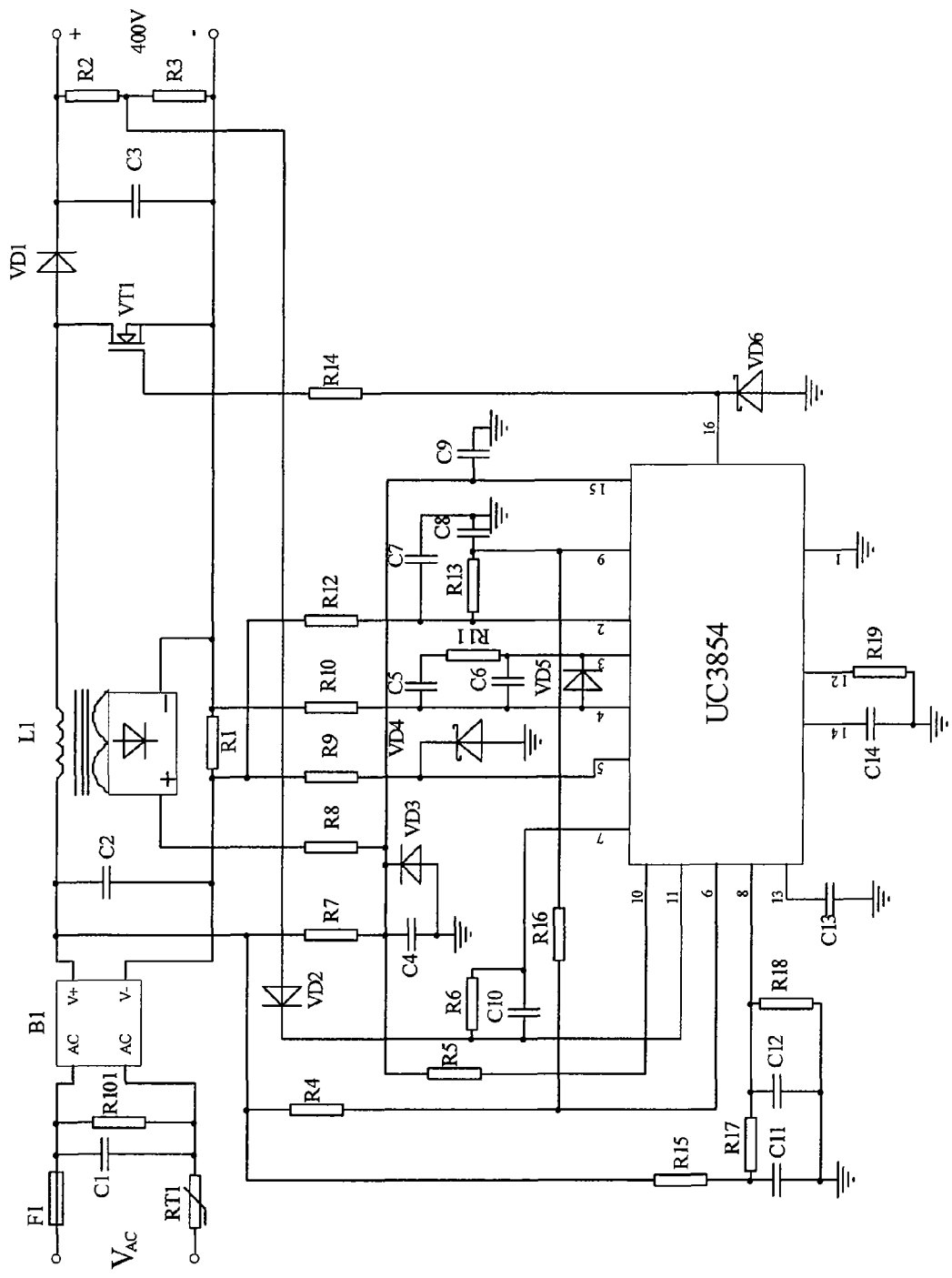
FIG. 4 is the schematic of an AC-DC power converter described in the embodiments in the present invention.

In an exemplary embodiment, the AC-DC power converter 12 includes a rectification circuit and a Boost PFC power factor correction circuit, as is illustrated in FIG. 4. The rectification circuit, which consists of bridge rectifier B1, is at the fore end of the AC-DC power converter 12 and is followed by the Boost PFC power factor correction circuit, which consists of IC UC3854, inductor L1, switching transistor VT1, and diode VD1. The rectification circuit converts the AC voltage into a high DC voltage, which is processed through the PFC power factor correction circuit and becomes a high DC voltage of approximately 400V.

Figure 5:
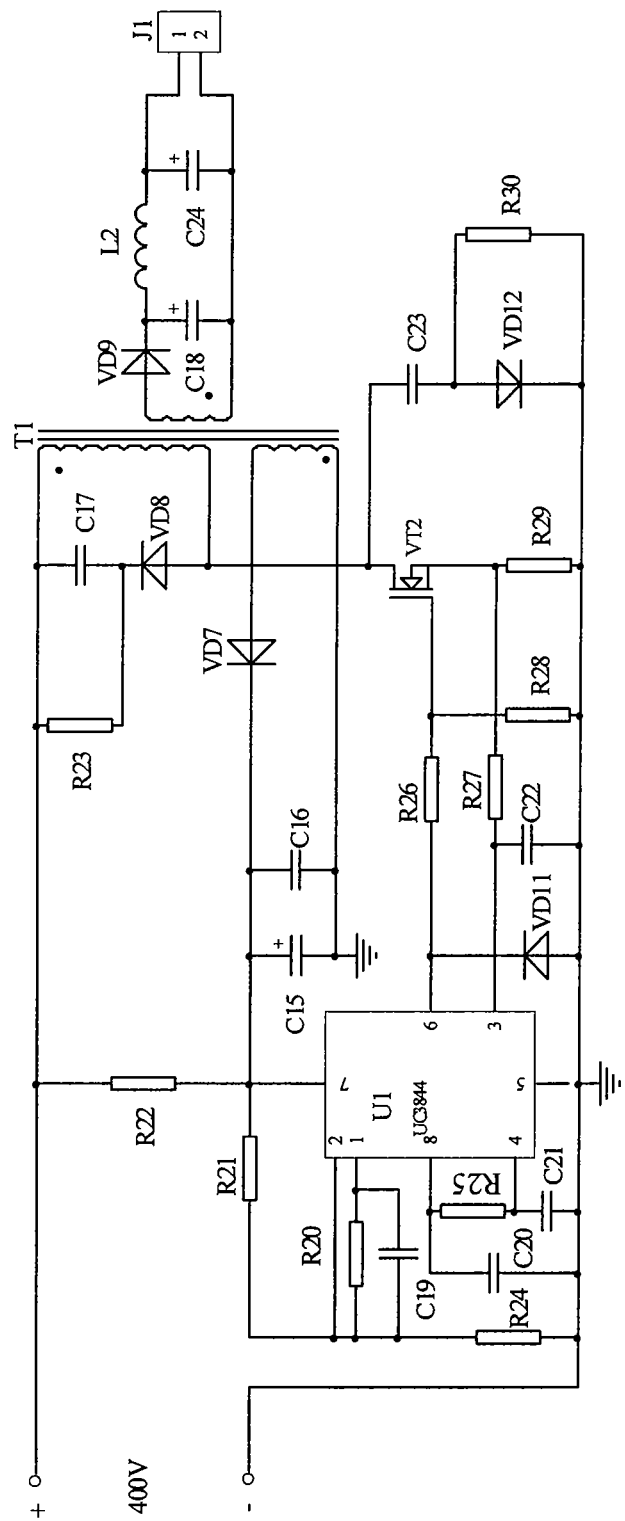
FIG. 5 is the schematic of a DC-DC power converter described in the embodiments in the present invention.

The DC-DC power converter 14 includes a DC-DC conversion circuit which is an isolated DC-DC conversion circuit or a non-isolated DC-DC conversion circuit. The DC-DC conversion circuit converts the input high DC voltage into a desired DC voltage at the output. FIG. 5 shows a Flyback isolated DC-DC power converter 14 that consists of transformer T1, switching transistor VT2, IC U1 (UC3844), diode VD9, capacitor C18, inductor L2, and capacitor C24. The 400V high DC voltage is converted by the DC-DC power converter 14 into low voltage and high current at the output terminal 5, illustrated in FIGS. 2 & 3, to provide power supply to the load.

As the AC-DC converter 12 and DC-DC converter 14 are packaged separately, the surface of the power adapter is increased, and so is the surface for heat dissipation. Also, because the output voltage of the AC-DC converter 12 is high voltage and the current is low, the AC cord 7, as illustrated in FIG. 2, can be made of thinner and more flexible wire. The DC cord 11 between the DC-DC power converter 14 and output terminal 5, though comparatively thicker, can be very short, or even omitted, which greatly improves the efficiency and performance of the power adapter as a result of lowered power loss and cost.

Accordingly, in an exemplary embodiment of the invention, AC voltage from the AC input terminal 1 is converted by the AC-DC power converter 2 into a high DC voltage (and/or current), the power factor of the input AC power supply is increased, and the high DC voltage, transmitted by DC cord 13, is then converted by the DC-DC power converter 14 into a DC voltage desired to provide power supply to the load via DC cord 11, and output terminal 5.

Several improvements result from this configuration. As the AC-DC converter 12 and DC-DC converter 14 are packaged separately, the surface of the power adapter is increased, and so is the surface for heat dissipation. Consequently, the working conditions of the inside components, disclosed herein, are greatly improved. By adopting a split package design without changing the output power, the size of a heat sink can be reduced, which further leads to reduced size, weight, and cost of the power adapter. As disclosed above, the heat sink may be the surface of the AC-DC converter 12 and/or the DC-DC converter 14. In another exemplary embodiment, a separate heat sink may be provided, such as but not limited to a finned heat sink attached to either of the surfaces of the two converters 12, 14.

In addition, as the input of DC-DC power converter 14 is pre-regulated to a DC voltage of approximately 400V, the DC-DC power converter will occupy a very small footprint nearby the load. As a result, the DC cord 11 between DC-DC power converter 14 and output terminal 5, though comparatively thicker, can be very short, or even omitted, which greatly enhances the efficiency and load regulation of the power adapter as a result of reduced cost, size, weight, and power loss of the output wire.

Thus, when compared to the prior art, the present invention costs less to manufacture, is smaller, lighter, easier to fabricate, and easier to use, yet this invention transfers power more efficiently, and regulates the power output better. The improvements over the prior art are particularly noted in circumstances where high current is desired, where it is of remarkable practicality and can bring forward considerable economic benefits.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A power adapter with two modules with separate enclosures, the power adapter comprising:
   an AC input terminal;
   an AC-DC power converter module configured for packaging in a first enclosure which is in electrical communication with the AC input terminal;
   a DC-DC power converter module configured for packaging in a second enclosure; and
   an output terminal configured to provide high current and low voltage;
   a first cord between the AC-DC power converter module and the DC-DC power converter module carrying a high voltage of approximately 400 volts;
   a second cord electrically connecting the DC-DC power converter module to the output terminal;
   wherein the second cord is of a constant minimum length to provide for a constant high efficiency and constant load regulation; and
   wherein the first enclosure comprises a first surface to provide for heat dissipation and the second enclosure comprises a second surface to provide for heat dissipation wherein heat dissipation from either the first enclosure or the second enclosure is independent of the other enclosure.

2. The power adapter of claim 1, wherein the AC-DC power converter comprises a rectification circuit and an isolated DC-DC conversion circuit, and wherein the rectification circuit is at a fore end of the AC-DC power converter and is followed by the isolated DC-DC conversion circuit, and wherein the rectification circuit converts an AC voltage into a high DC voltage which will be converted by the isolated DC-DC conversion circuit into a desired DC voltage at the output terminal.

3. The power adapter of claim 1, wherein the AC-DC power converter comprises a rectification circuit and a power factor correction circuit, and wherein the rectification circuit is at a fore end of the AC-DC power converter and is followed by the power factor correction circuit, and wherein the rectification circuit converts an AC voltage into a high DC voltage, which is converted into the high DC voltage at the output terminal by the power factor correction circuit.

4. The power adapter of claim 1, wherein the DC-DC power converter comprises a DC-DC conversion circuit, and wherein the DC-DC conversion circuit is either an isolated DC-DC conversion circuit or a non-isolated DC-DC conversion circuit.

5. The power adapter of claim 1, wherein the AC-DC power converter and the DC-DC power converter are connected via at least one removable cord and/or at least one permanent cord.

6. The power adapter of claim 1, wherein the AC-DC power converter and the AC input terminal are packaged in a single component.

7. The power adapter of claim 1, wherein the AC-DC power converter and the AC input terminal are separate components and are connected via at least one cord.

8. The power adapter of claim 1, wherein the first cord is thinner, Longer, and/or more flexible when compared to the second cord, which is thicker and shorter.

9. The power adapter of claim 1, wherein additional surface area for heat dissipation is provided by having the AC-DC power converter individually packaged and the DC-DC power converter individually packaged.

10. The power adapter of claim 1, wherein the minimum length of the second cord is of no length wherein the output terminal and DC-DC power converter are a single component.

* * * * *